(12) United States Patent
Menke (10) Patent No.: US 8,115,330 B2
(45) Date of Patent: Feb. 14, 2012

(54) WIND TURBINE AND METHOD FOR OPERATING A WIND TURBINE

(75) Inventor: Detlef Menke, Lotte (DE)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/826,331

(22) Filed: Jun. 29, 2010

(65) Prior Publication Data

US 2011/0140423 A1    Jun. 16, 2011

(51) Int. Cl.
  *F03D 9/00*     (2006.01)
  *H02P 9/04*     (2006.01)
(52) U.S. Cl. ............................................ 290/44; 290/55
(58) Field of Classification Search .................... 290/44, 290/55
  See application file for complete search history.

(56) References Cited

U.S. PATENT DOCUMENTS

| | | | | |
|---|---|---|---|---|
| 4,160,170 A * | 7/1979 | Harner et al. | | 290/44 |
| 4,161,658 A * | 7/1979 | Patrick | | 290/44 |
| 4,189,648 A * | 2/1980 | Harner | | 290/44 |
| 4,193,005 A * | 3/1980 | Kos et al. | | 290/44 |
| 4,584,486 A * | 4/1986 | Quynn | | 290/44 |
| 4,700,081 A * | 10/1987 | Kos et al. | | 290/44 |
| 4,703,189 A * | 10/1987 | DiValentin et al. | | 290/44 |
| 5,798,631 A * | 8/1998 | Spee et al. | | 322/25 |
| 6,137,187 A * | 10/2000 | Mikhail et al. | | 290/44 |
| 7,352,075 B2 * | 4/2008 | Willey et al. | | 290/44 |
| 7,420,289 B2 * | 9/2008 | Wang et al. | | 290/44 |
| 7,525,209 B2 | 4/2009 | Kabatzke | | 290/44 |
| 7,629,702 B2 * | 12/2009 | Schubert | | 290/44 |
| 7,679,208 B1 * | 3/2010 | Ko et al. | | 290/44 |
| 7,714,458 B2 * | 5/2010 | Harms et al. | | 290/44 |
| 7,763,989 B2 * | 7/2010 | Kinzie et al. | | 290/44 |
| 7,823,437 B2 * | 11/2010 | Siebers et al. | | 73/1.37 |
| 7,855,467 B2 * | 12/2010 | Kawazoe et al. | | 290/44 |
| 7,942,634 B2 * | 5/2011 | Christensen | | 416/1 |
| 7,945,351 B2 * | 5/2011 | Lim et al. | | 700/287 |
| 7,983,844 B2 * | 7/2011 | Beach et al. | | 702/3 |
| 8,008,795 B2 * | 8/2011 | Turner et al. | | 290/44 |
| 8,013,460 B2 * | 9/2011 | Kinzie et al. | | 290/44 |

(Continued)

*Primary Examiner* — Pedro J Cuevas
(74) *Attorney, Agent, or Firm* — Global Patent Operation; Douglas D. Zhang (57) ABSTRACT

The present disclosure relates to a method for operating a wind turbine, the wind turbine comprising a wind rotor having at least one rotor blade and a generator connected to the wind rotor, wherein the generator is adapted to be connected to a grid, wherein the method comprises: adjusting at least one wind turbine parameter to increase the rotational speed of the wind rotor; increasing the rotational speed of the wind rotor; during increasing of the rotational speed of the wind rotor determining if the wind turbine would exceed a predetermined amount of energy to be fed into the grid at the actual wind rotor rotational speed; and during increasing of the rotational speed of the wind rotor connecting the wind turbine to the grid if determining that the wind turbine would exceed the predetermined amount of energy to be fed into the grid. Further, the present disclosure relates to a wind turbine comprising a wind rotor, wherein the wind rotor is mechanically connected to a generator for transmitting the rotational power of the wind rotor having at least one rotor blade to the rotor of the generator, wherein the output current of the generator is adapted to be selectively connected to a grid by a circuit breaker, the wind turbine further comprising a control device adapted to close or to trip the circuit breaker, wherein the control device is adapted to perform the method disclosed herein.

20 Claims, 4 Drawing Sheets

U.S. PATENT DOCUMENTS

| | | | |
|---|---|---|---|
| 8,035,241 B2 * | 10/2011 | Subramanian et al. | 290/44 |
| 8,035,242 B2 * | 10/2011 | Landa et al. | 290/44 |
| 2007/0194574 A1 * | 8/2007 | Kabatzke et al. | 290/44 |
| 2007/0205602 A1 * | 9/2007 | Willey et al. | 290/44 |
| 2008/0140263 A1 * | 6/2008 | Wang et al. | 700/291 |
| 2008/0179887 A1 * | 7/2008 | Kawazoe et al. | 290/44 |
| 2008/0307853 A1 * | 12/2008 | Siebers et al. | 73/1.29 |
| 2009/0212566 A1 * | 8/2009 | Harms et al. | 290/44 |
| 2010/0066086 A1 * | 3/2010 | Ko et al. | 290/44 |
| 2010/0133817 A1 * | 6/2010 | Kinzie et al. | 290/44 |
| 2011/0006527 A1 * | 1/2011 | Kinzie et al. | 290/44 |
| 2011/0074152 A1 * | 3/2011 | Yasugi | 290/44 |
| 2011/0080001 A1 * | 4/2011 | Gundtoft et al. | 290/44 |
| 2011/0125419 A1 * | 5/2011 | Bechhoefer et al. | 702/34 |
| 2011/0135465 A1 * | 6/2011 | Braicks | 416/1 |
| 2011/0135466 A1 * | 6/2011 | Latorre et al. | 416/1 |
| 2011/0135473 A1 * | 6/2011 | Singamsetti et al. | 416/61 |
| 2011/0140431 A1 * | 6/2011 | Landa et al. | 290/44 |
| 2011/0142619 A1 * | 6/2011 | Subramanian et al. | 416/1 |
| 2011/0142624 A1 * | 6/2011 | Vadari et al. | 416/1 |
| 2011/0156388 A1 * | 6/2011 | Yasugi et al. | 290/44 |

* cited by examiner

Fig. 5

WIND TURBINE AND METHOD FOR OPERATING A WIND TURBINE

BACKGROUND OF THE INVENTION

The present disclosure relates to a method for operating a wind turbine, in particular a method for operating a wind turbine, the wind turbine including a wind rotor having at least one rotor blade and a generator connected to the wind rotor, wherein the generator is adapted to be connected to a grid. Further, the present disclosure relates to a wind turbine. In particular the present disclosure relates to a wind turbine, the wind turbine including a wind rotor having at least one rotor blade and a generator connected to the wind rotor, wherein the generator is adapted to be connected to a grid.

When starting a wind turbine, typically, the wind rotor is arrested by a parking brake. Then, the wind speed is measured. The rotor blades are moved into the wind by a blade pitch system when the wind speed is within the operating range of the wind turbine, for example 6 to 24 m/s. In a typical embodiment, the wind turbine is started if the wind speed exceeds a predetermined speed, for example 3.5 m/s. Then, the wind turbine is operated in a spinning mode. In the spinning mode, a spinning rotation of a wind rotor or a rotor of a generator is measured and an average of the spinning rotation is calculated. When the wind turbine is rotating in the spinning rotation, a blade pitch is about 60 degrees with respect to the plane of rotation. In the event that this calculated average exceeds a predetermined value of the rotational speed of the wind rotor, the turbine runs up. In the run-up procedure, the blade pitch angle is modified to an operating pitch angle between −1 to 20 degrees with respect to the plane of rotation. After the run-up procedure, the wind turbine is idling for cut-in and the generator of the wind turbine is connected to the grid. Typically, the wind turbine is operated, such that the rotational speed of the wind rotor is controlled and held substantially constant for a predetermined time, for example more than 25 seconds, at a predetermined rotational speed, such that the rotational speed of the wind turbine may be synchronized with the grid and subsequently connected with the grid. Thus, the wind turbine goes into the state of a load or partial load operation. Then, the wind turbine accelerates further to the optimal operation point.

Typically, wind turbines are controlled by a programmable logic circuit (PLC). The software running on the PLC controls the behavior of the turbine dependent on sensors, actors, external connected devices, the actual wind turbine state, etc. Typically, a state machine may control the run up of the wind turbine. This state machine includes typically a "cut-in" state in which the generator speed is controlled to a cut-in speed. For example, the turbine goes online if the actual generator speed reaches and stays at the cut-in speed. A speed control, for example a closed loop control, regulates the generator speed to this cut-in speed. The speed control is typically realized by controlling the pitch of the blades.

BRIEF DESCRIPTION OF THE INVENTION

In view of the above, a method for operating a wind turbine is provided, the wind turbine including a wind rotor having at least one rotor blade and a generator connected to the wind rotor, wherein the generator is adapted to be connected to a grid, wherein the method includes: —adjusting at least one wind turbine parameter to increase the rotational speed of the wind rotor; —Increasing the rotational speed of the wind rotor; —during increasing of the rotational speed of the wind rotor determining if the wind turbine would exceed a predetermined amount of energy to be fed into the grid at the actual wind rotor rotational speed; and—during increasing of the rotational speed of the wind rotor connecting the wind turbine to the grid if determining that the wind turbine would exceed the predetermined amount of energy to be fed into the grid.

According to another aspect, a method for operating a wind turbine is provided, the wind turbine including a wind rotor having at least one rotor blade and a generator connected to the wind rotor, wherein the generator is adapted to be connected to a grid, wherein the method includes: —operating the wind turbine in a run-up mode, wherein the wind turbine parameters are adapted to increase the rotational speed of the wind rotor, and wherein it is determined, whether the wind turbine would exceed a predetermined amount of energy to be fed into the grid at the actual wind rotor rotational speed; wherein during increasing of the rotational speed of the wind rotor, the rotational speed is less than 5 seconds substantially constant, and—operating the wind turbine in a load operation mode.

According to a further aspect, a wind turbine including a wind rotor is provided, wherein the wind rotor is mechanically connected to a generator for transmitting the rotational power of the wind rotor having at least one rotor blade to the rotor of the generator, wherein the output current of the generator is adapted to be selectively connected to a grid by a circuit breaker, the wind turbine further including a control device adapted to close or to trip the circuit breaker, wherein the control device is adapted to: —operate the wind turbine in a run-up mode, wherein the wind turbine parameters are adapted to increase the rotational speed of the wind rotor, and wherein it is determined, whether the wind turbine would exceed a predetermined amount of energy to be fed into the grid at the actual wind rotor rotational speed; wherein during increasing of the rotational speed of the wind rotor, the rotational speed is less than 5 seconds substantially constant; and—change from the run-up mode into the load operation mode and connect the wind turbine to the grid if it is determined in the run-up mode that the wind turbine would exceed the predetermined amount of energy to be fed into the grid at the actual wind rotor rotational speed.

Further aspects, advantages and features of the present invention are apparent from the dependent claims, the description and the accompanying drawings.

BRIEF DESCRIPTION OF THE DRAWINGS

A full and enabling disclosure including the best mode thereof, to one of ordinary skill in the art, is set forth more particularly in the remainder of the specification, including reference to the accompanying figures wherein.

DETAILED DESCRIPTION OF THE INVENTION

Reference will now be made in detail to the various embodiments, one or more examples of which are illustrated in each figure. Each example is provided by way of explanation and is not meant as a limitation. For example, features illustrated or described as part of one embodiment can be used on or in conjunction with other embodiments to yield yet further embodiments. It is intended that the present disclosure includes such modifications and variations.

Figure 1:
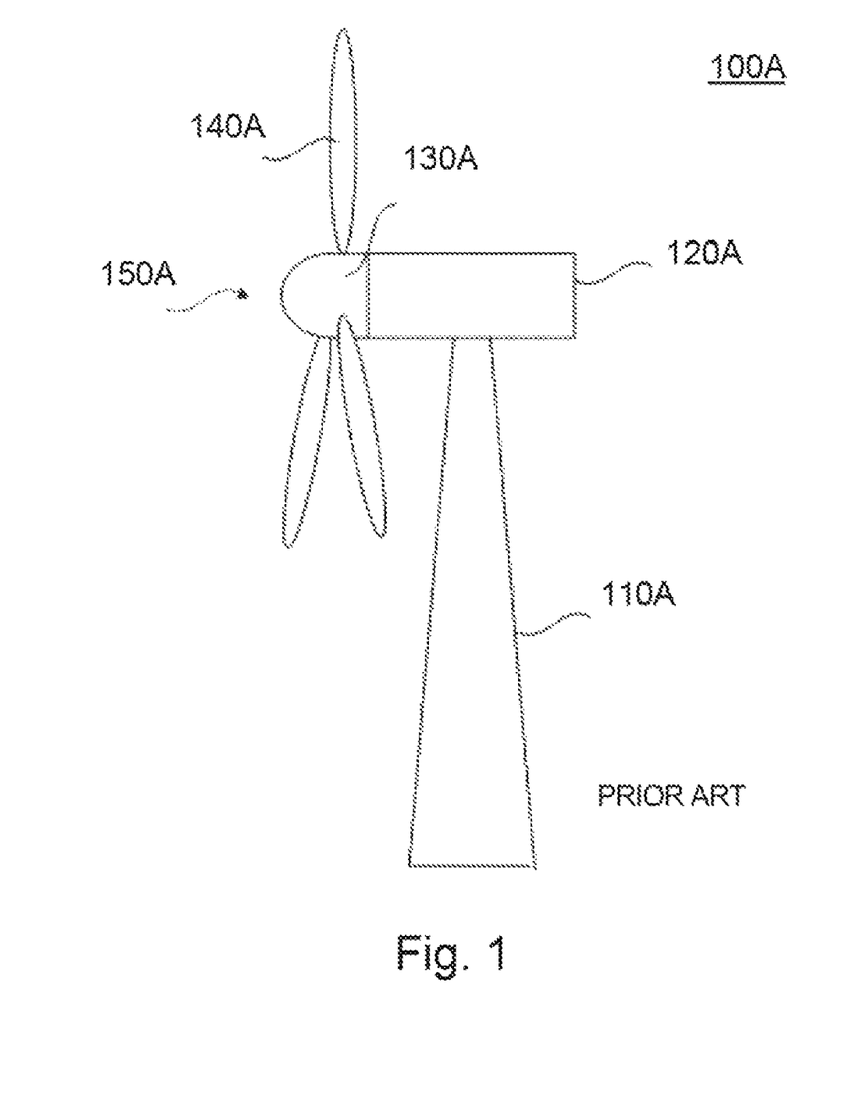
FIG. 1 shows schematically an embodiment of a wind turbine.

FIG. 1 shows a wind turbine 100A. The wind turbine 100A includes a tower 110A on which a nacelle 120A is mounted. The nacelle 120A is rotatable about a vertical axis of the tower. Within the nacelle 120A, a generator (not shown) for transforming rotational energy into electrical energy is placed. The generator is connected to a hub 130A that is rotatable about a horizontal axis. Three rotor blades 140A are connected to the hub 130A. The rotor blades 140A and the hub, 130A together form a wind rotor of the wind turbine 100A. The wind turbine 100A operates as follows. In a typical situation, the nacelle 120A is rotated about the vertical axis such that the horizontal axis of the hub 130A is approximately parallel to a wind direction. The wind exerts a torque on the wind rotor due to an aerodynamical profile of the rotor blades 140A. Accordingly, the wind rotor rotates about its horizontal axis, thus driving the generator. The generator transforms the mechanical rotation into an electric current. Hence, the kinetic energy of the wind is transformed into electric energy.

Figure 2:
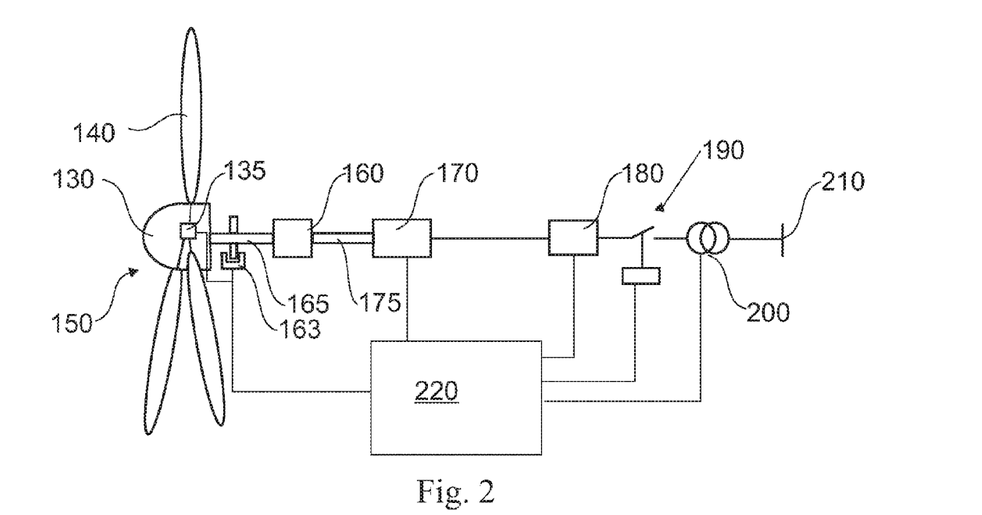
FIG. 2 shows schematically functional components of an embodiment of a wind turbine.

FIG. 2 shows a schematic drawing of some functional elements of a wind turbine. The wind rotor 150 is coupled to a gear box 160 via a wind rotor shaft 165, wherein the gear box 160 converts a first rotational speed of the wind rotor 150 to a second rotational speed that is adapted for a generator 170 which is connected to the output side of the gear box 160 with a generator rotor shaft 175. In a typical embodiment, the drive train of a wind turbine may be defined by the mechanical components of the wind turbine. For example, in an embodiment, the drive train includes the wind rotor shaft 165, the gear box 160, and the generator rotor shaft 175. The generator rotor shaft 175 drives a rotor of the generator 170. In further embodiments, the wind rotor shaft directly drives the rotor of the generator 170. Thus, in some embodiments, the gear box 160 may be omitted. The produced electrical current of the generator 170 is then fed in a typical embodiment into an inverter 180 which is connected via a circuit breaker 190 and a transformer 200 to a grid 210. The wind turbine further includes a control device 220 which may control, in a typical embodiment, for example, the pitch of the rotor blades, a brake 163 of the wind rotor, the gear box 160, the generator 170, the inverter 180, the circuit breaker 190, and the transformer 200. In a typical embodiment, the brake 163 is arranged at the wind rotor shaft 165. In other embodiments, the brake may be arranged at the generator rotor shaft 175.

When the wind turbine is connected to the grid 210, the generator 170 produces power that is fed into the grid 210. However, the wind turbine has an own consumption of power that reduces the efficiency of the wind turbine. Typically, the wind turbine has a specific efficiency which is determined by the efficiency of each component of the wind turbine. For example, the inverter of the wind turbine consumes energy. Further, some energy may be needed for a pitch drive or control of the wind rotor. In another embodiment, a heating or a cooling device of the gear box consumes energy. Further losses of energy may occur for example in the inverter 180, the generator 170, and the transformer 200. Typically, only the difference between the power that is produced and the power that is consumed by the wind turbine is fed into the grid. Typically, in some embodiments, the produced energy to be fed into the grid may exceed a predetermined limit to be connected and to stay connected to the grid.

Figure 3:
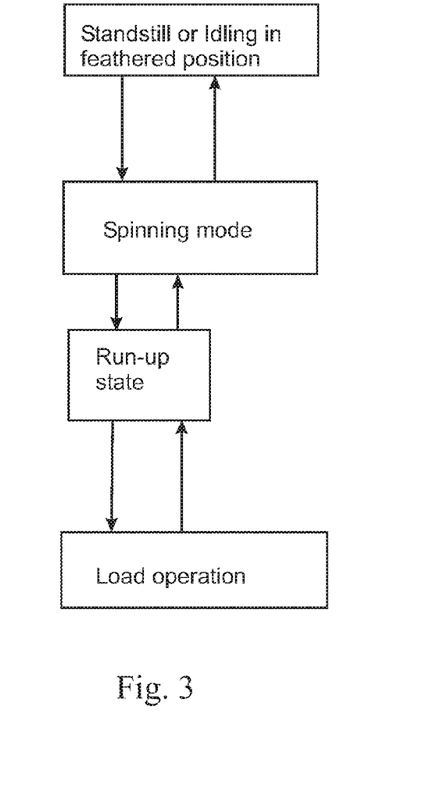
FIG. 3 shows schematically an embodiment of a drive train of a wind turbine.

FIG. 3 shows the different states of the wind turbine according to an embodiment. Typically, embodiments may have further states not shown in FIG. 3. In some embodiments, the wind turbine may include the following states: Stop or standstill, when the wind rotor is substantially stopped. Such a mode may include also an idling in the feathered position. A spinning mode, when the wind rotor rotates with a spinning rotational speed. Further, a run-up state, when the wind turbine accelerates from the spinning mode, and the load operation, when the wind turbine is connected to the grid. The load operation state may include partial load states and full load states. Further, in the load operation the wind rotor of the wind turbine may be further accelerated to the optimal working point. Typically, the optimal working point may depend on the condition of the wind turbine and the environmental conditions.

Typically, before a wind turbine is started, the control device 220 checks an operational status of the some systems, for example, the inverter 180, the transformer 200, the gear box 160, and/or the pitch drive 135. Typically, the wind rotor is arrested in a standstill position by the parking brake 163. In further embodiments, the wind rotor is not arrested by the parking brake 163 during a stand-by operation. For example, the rotor blades 140 are then in a feathered position. In the event that the check of the system was positive, that means, that no error or important error was detected, the jaw or azimuth system turns the wind turbine in the wind direction, for example, if the mean wind speeds exceeds a predetermined value. Then, in an embodiment, the wind speed may be again measured. For example, an anemometer may measure the wind speed. The rotor blades are moved into the wind by the pitch drive 135, for example into a spinning position, for example to accelerate the wind rotor 150 to a spinning rotation, when the wind speed is within the operating range of the wind turbine, for example 2 to 24 m/s and/or no fault are determined when the operational status of the systems have been checked. Then, the wind turbine is in a spinning mode. In a typical embodiment, the wind rotor 150 is accelerated to spinning rotation, when the wind speed exceeds 3.0 m/s. In a typical embodiment, the pitch drive 135 turns the rotor blades 140 to about 65 or about 60 degrees with respect to the rotating plane of the wind rotor 150. Typically, the wind rotor accelerates up to a spinning rotation speed, which is below a rotation speed when the wind turbine is connected to the grid. A spinning rotation speed is, in a typical embodiment, between 0.5 and 1.5 rpm, in particular between 0.8 and 1 rpm. When the wind rotor has accelerated to the spinning rotation speed, the wind turbine is in the spinning mode (see FIG. 3). In other embodiments, the wind turbine changes from the stop, standstill or idling state into the spinning mode after a reset or a start of the wind turbine.

Then, a run-up event is triggered by the control device 220, when the control device has decided that the wind turbine will produce enough energy to be connected to the grid. For example the run-up event may be triggered, when the rotational speed of the wind rotor is above a predetermined minimum speed (Vrotmin), and below a predetermined maximal speed (Vrotmax), for example if the wind speed is less than 25 m/s, for a predetermined minimum time (tmin). Hence, the speed of the wind rotor is observed about a predetermined minimum time. Thus, before a run-up event is triggered it is observed if enough energy would be produced and if it is allowed to run-up the wind turbine. When the run-up event is triggered, the wind turbine may start a run-up procedure. The wind turbine is then in a run-up state. Typically, in a run-up procedure, the blade pitch angle is modified to an operating pitch angle between −1 to 5 degrees with respect to the plane of rotation. For example, in the run-up state, a period in which the rotational speed is controlled is omitted. Typically, in a period in which the rotational speed is controlled, a pitch angle of the rotor blades is controlled to maintain the rotational speed of the wind rotor substantially constant, in particular at a predetermined rotational speed. In an embodiment, if the wind turbine has been for a predetermined maximum time in the run-up state without changing to the load operation, the wind turbine changes again into the spinning mode.

Figure 4:
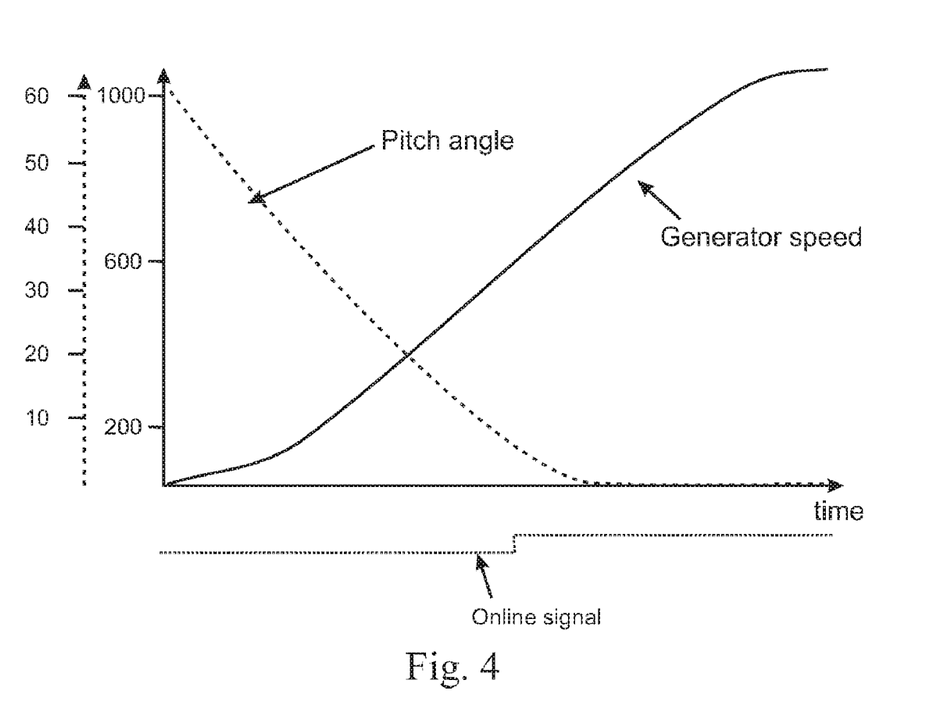
FIG. 4 is a pitching behavior chart.

FIG. 4 shows the pitching behavior at about a wind speed of 5 m/s at the run up state of a wind turbine and the transition into the load operation. As it can be seen, in a typical embodiment, which may be combined with other embodiments disclosed herein, the pitch angle of the rotor blades is steadily reduced or substantially monotonic decreasing from a substantially constant pitch angle of the spinning mode, typically between 50 and 70 degrees, for example about 60 degrees, to a pitch angle of less than 5 degrees, in particular less than 2 degrees with respect to the rotor plane. Hence, the rotational speed of the wind rotor is typically not controlled. At the same time, the generator speed accelerates, for example steadily. In a typical embodiment, during the time of acceleration, in particular the complete time, the possible electrical energy to be fed into the grid may be monitored, for example including the efficiency or the actual efficiency of the wind turbine. If the electrical energy to be fed into the grid is above a predetermined value, the controller of the wind turbine may trigger an online signal, such that the circuit breaker connects the generator to the grid. Thus, for example, the energy to be fed into the grid may be a cut-in condition. Typically, the wind rotor speed at which the wind turbine is connected to the grid may vary, depending on the actual environmental conditions, for example the temperature, and the conditions of the wind turbine. In other embodiments, the cut-in condition may depend on the rotor speed.

Typically, if this variable used for determining the cut-in condition exceeds a predetermined limit, the turbine may be connected to the grid. In an embodiment, the predetermined value or threshold value may be configured dependent on the location of the wind turbine. In an embodiment, if during run-up of the wind rotor, i.e. when the wind turbine is in the run-up state, the wind turbine is not connected within a predetermined time, the wind turbine is set back into the spinning mode. Typically, when the wind turbine is connected to the grid, i.e. the wind turbine is cut-in, the wind turbine state is changed to load operation. Thus, for example, the transition event from changing from the "Run-up state" to the "Load operation" state may be a signal to connect the wind turbine to the grid.

In a typical embodiment, which may be combined with other embodiments disclosed herein, if the wind turbine is in the load operation and the rotational speed of the wind rotor is below a predetermined load rotational speed (Vrotloadmin), the wind turbine is set to the run up condition and disconnected from the grid. In an embodiment, which may be combined with other embodiments disclosed herein, the wind turbine is also disconnected from the grid, when the mean power fed into the grid is below a predetermined threshold (Pmin) for a predetermined time (tmin). The states shown in FIG. 3 may have further transition to other states or modes not shown in FIG. 3. For example the load operation may have a transition to a load shut-down state. Further, the load operation may include full load part load states with and without tower resonance.

Thus, a cut-in state, where the rotational speed of the wind rotor is controlled is eliminated and the wind turbine is cut-in on the fly. In a typical embodiment, a full size 4-quadrant converter is able to synchronize with the grid at any time the grid is available and switch on the delivered energy from the generator if it is high enough to fit into the grid. Typically, embodiments enclosed herein have a fast cut-in compared to wind turbines including a separate "cut-in state" in the state machine, such that the energy production is performed earlier. In typical embodiments, the load is reduced due to the reducing of the plate pitching. Typically, in some embodiments which may be combined with other embodiments disclosed herein, there is a generator speed independent cut-in, i.e. the generator speed may be in some embodiments not a parameter for cut-in, such that the cut-in may be a result of the actual turbine state, for example energy losses and/or actual efficiency. Further, in some embodiments, this may result in the reducing of the main switch or circuit breakers switching or tripping, such that the maintenance costs may be reduced. Further, mechanical rotation energy that is not used within the cut-in speed control or in the "cut-in state" may be transformed into electrical energy. Further, in the run-up mode or state the wind turbine rotor has typically a substantial constant speed less than 5 seconds, in particular less than 2 seconds, for example less than 1 second. This may lead to a fast and easier cut-in procedure, for example of about 1 minute, because embodiments disclosed herein typically do not need a speed synchronization, in particular before the generator is connected to the grid.

Figure 5:
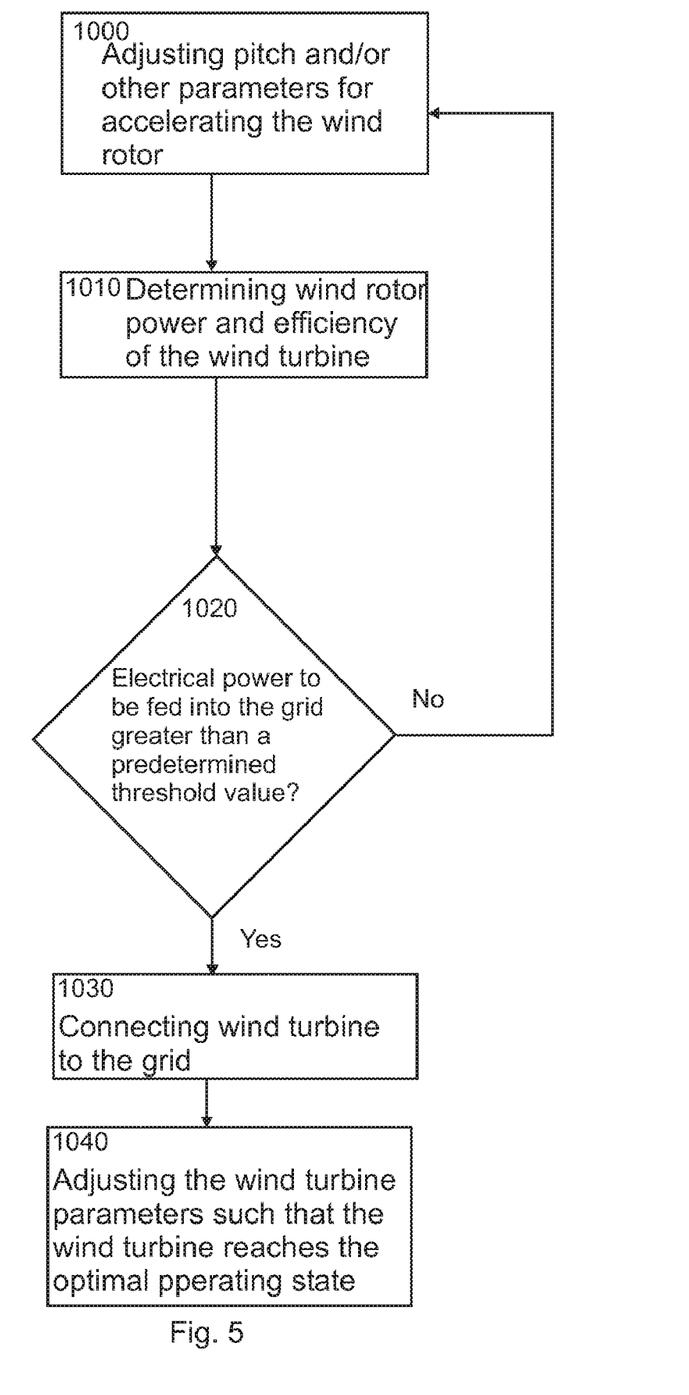
FIG. 5 shows a flowchart of an embodiment of a method.

FIG. 5 shows a flowchart of a method according to an embodiment. The flow chart may represent the control of the wind turbine in the run up state. Typically, in box 1000, the pitch and/or other parameters of the wind turbine are adjusted, such that the wind rotor of the wind turbine accelerates. In an embodiment, during the acceleration or increasing of the rotational speed of the wind rotor, as it is shown in box 1010, the wind rotor power and the efficiency of the wind turbine are determined. Typically, the wind rotor power and/or the efficiency is continuously or in intervals determined. In other embodiments, other parameters may be used for determining a potential electrical energy to be fed into the grid. Depending on the efficiency and the wind rotor power, the electrical power to be fed into the grid may be calculated and compared with a predetermined threshold value, as shown in box 1020. In other embodiments the wind power may be directly compared with a predetermined threshold value. In case the electrical power to be fed into the grid is below the predetermined value, the wind turbine parameters and the pitch are further adjusted to accelerate the wind rotor. If the calculated power to be fed into the grid is greater than a predetermined threshold value, the wind turbine is connected to the grid or cut-in, and the wind turbine changes into the load operation state. Typically, in embodiment in box 1040, the wind turbine parameters, for example the pitch, are adjusted such that the wind turbine reaches the optimal operating state. For example, the wind rotor may be further accelerated and the plate pitch may be adjusted to 0 degree.

According to a typical embodiment, which may be combined with other embodiments disclosed herein, during increasing of the rotational speed of the wind rotor, the rotational speed is less than 5 seconds substantially constant, in particular less than 1 second. In a typical embodiment, a substantially constant rotational speed means, that the wind turbine controls the rotational speed by controlling the pitch angle, such that the rotational speed is maintained substantially at a predetermined speed.

In a typical embodiment, after the connection to the grid, adjusting the wind turbine parameters to drive the wind turbine in the optimal operating point, depending on environmental conditions and the wind turbine parameters.

According to an embodiment, which may be combined with other embodiments disclosed herein, a method may include operating the wind turbine in a spinning mode, wherein the at least one rotor blade of the wind rotor is operated with a substantial constant pitch angle and the generator of the wind turbine is not electrically connected to the grid. Typically, the rotational speed of the wind rotor is increased from the spinning mode if at least one condition is fulfilled of the group consisting of: the wind turbine has been a predetermined time in an idling mode, and the rotational speed is within a predetermined wind rotor rotational speed range. In a typical embodiment the rotational speed of the wind rotor is substantially continuously increased, for example, the rotational speed during acceleration may include short periods where the speed decreases or has substantially the same rotational speed. In a typical embodiment a method may include adjusting at least one wind turbine parameter for changing to the spinning mode, when the wind turbine is not connected to the grid within a predetermined time during increasing the rotational speed from the idling mode. In a typical embodiment, in the run-up mode the pitch angle of the rotor blades is substantially monotonic decreasing from a substantial constant pitch angle of the spinning mode, to a pitch angle of less than 5 degrees with respect to the rotor plane. In another embodiment, which may be combined with other embodiments disclosed herein, in the run-up mode the pitch angle of the rotor blades is controlled depending on the loads acting on the wind turbine.

According to an embodiment, which may be combined with other embodiments disclosed herein, the energy to be fed into the grid is determined based on the efficiency of the wind turbine, in particular the internal consumption of energy of the wind turbine.

In a further embodiment, which may be combined with other embodiments disclosed herein, if it is determined in the run-up mode that the wind turbine would exceed the predetermined amount of energy to be fed into the grid at the actual wind rotor rotational speed, the mode of the wind turbine is changed from the run-up mode into the load operation mode, and the wind turbine is connected to the grid.

Typically in an embodiment, a method may include operating the wind turbine in a spinning mode, wherein the at least one blade of the wind rotor is operated with a substantial constant pitch angle and the generator of the wind turbine is not electrically connected to the grid. Typically, a method may include that the mode of the wind turbine is changed from the run-up mode to the spinning mode, when the wind turbine stays in the run-up mode longer than a predetermined run-up time. In a further embodiment, the mode of the wind turbine is changed from the spinning mode to the run-up mode if at least one condition is fulfilled of the group consisting of: the wind turbine has been a predetermined time in the idling mode, and the wind rotor rotational speed is within a wind rotor rotational speed range.

In a typical embodiment, which may be combined with other embodiments disclosed herein, the control device is further adapted to adjusting the wind turbine parameters to drive the wind turbine in the optimal operating point after the connection to the grid, depending on environmental conditions and the wind turbine parameters.

In a typical embodiment, the control device is further adapted to operate the wind turbine in a spinning mode, wherein the at least one rotor blade of the wind rotor is operated with a substantial constant pitch angle and the generator of the wind turbine is not electrically connected to the grid. Typically, the control device is further adapted to change the mode of the wind turbine from the spinning mode to the run-up mode if at least one condition is fulfilled of the group consisting of: the wind turbine has been a predetermined time in the idling mode, and the wind rotor rotational speed is within a wind rotor rotational speed range. In another embodiment, which may be combined with other embodiments disclosed herein, the control device is adapted to change the mode of the wind turbine from the run-up mode to the spinning mode, if the wind turbine is not connected to the grid within a predetermined time.

Typically, the control device is adapted to determine the energy to be fed into the grid depending on the efficiency of the wind turbine, in particular the internal consumption of energy of the wind turbine.

In a typical embodiment, which may be combined with other embodiments disclosed herein, the control device is further adapted to change the mode of the wind turbine from the load operation mode to the run-up mode if at least one condition is fulfilled of the group consisting of: the rotational speed of the wind rotor is below a predetermined minimal load rotational speed, and the power fed into the grid is within a predetermined time below a predetermined minimal power.

In a typical embodiment, the control device is further adapted to decrease in the run-up mode substantially monotonic the pitch angle of the rotor blades from a substantial constant pitch angle of the spinning mode to a pitch angle of less than 5 degrees with respect to the rotor plane. In another embodiment, which may be combined with other embodiments disclosed herein, the control device is adapted to decrease substantially monotonic the pitch angle of the rotor blades from a substantial constant pitch angle of the spinning mode to a pitch angle of less than 5 degrees with respect to the rotor plane in the run-up mode.

This written description uses examples, including the best mode, to enable any person skilled in the art to make and use the described subject-matter. While various specific embodiments have been disclosed in the foregoing, those skilled in the art will recognize that the spirit and scope of the claims allows for equally effective modifications. Especially, mutually non-exclusive features of the embodiments described above may be combined with each other. The patentable scope is defined by the claims, and may include such modifications and other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for operating a wind turbine, the wind turbine comprising a wind rotor having at least one rotor blade and a generator connected to the wind rotor, wherein the generator is configured to be connected to a grid, the method comprising:
    increasing a rotational speed of the wind rotor by adjusting at least one wind turbine parameter; and
    after enemy provided by the wind turbine exceeds a predetermined amount of energy to be fed into the grid, connecting the wind turbine to the grid while the rotational speed of the wind rotor is still increasing.

2. The method according to claim 1, wherein while the rotational speed of the wind rotor is still increasing, the rotational speed is not substantially constant for 5 seconds or more.

3. The method according to claim 1, further comprising:
    after the connecting step, adjusting wind turbine parameters to drive the wind turbine in an optimal operating point, depending on environmental conditions and the wind turbine parameters.

4. The method according to claim 1, further comprising:
    operating the wind turbine in a spinning mode in which the at least one rotor blade of the wind rotor is operated with a substantial constant pitch angle and the generator of the wind turbine is not electrically connected to the grid.

5. The method according to claim 4, wherein the rotational speed of the wind rotor is increased from a rotational speed for the spinning mode if at least one of the following is fulfilled:
the wind turbine has been a predetermined time in an idling mode, and
the rotational speed is within a predetermined wind rotor rotational speed range.

6. The method according to claim 4, further comprising:
adjusting at least one wind turbine parameter for changing to the spinning mode, when the wind turbine is not connected to the grid within a predetermined time during increasing the rotational speed from an idling mode.

7. The method according to claim 1, wherein the energy to be fed into the grid is determined based on an efficiency of the wind turbine.

8. A method for operating a wind turbine, the wind turbine comprising a wind rotor comprising at least one rotor blade and a generator connected to the wind rotor, wherein the generator is configured to be connected to a grid, the method comprising:
operating the wind turbine in a run-up mode, wherein wind turbine parameters are adjusted to increase a rotational speed of the wind rotor, wherein during increasing of the rotational speed of the wind rotor, the rotational speed is not substantially constant for 5 seconds or more, and
operating the wind turbine in a load operation mode.

9. The method according to claim 8, wherein in the run-up mode after the energy provided by the wind turbine exceeds a predetermined amount of energy to be fed into the grid at the actual rotational speed of the wind rotor, the mode of the wind turbine is changed from the run-up mode into the load operation mode, and the generator of the wind turbine is connected to the grid.

10. The method according to claim 8, further comprising:
operating the wind turbine in a spinning mode in which the at least one blade of the wind rotor is operated with a substantial constant pitch angle and the generator of the wind turbine is not electrically connected to the grid.

11. The method according to claim 10, wherein in the run-up mode the pitch angle of the at least one rotor blade is substantially monotonic decreasing from a substantial constant pitch angle of the spinning mode to a pitch angle of less than 5 degrees with respect to the rotor plane.

12. The method according to claim 10, wherein in the run-up mode the pitch angle of the at least one rotor blade is controlled depending on loads acting on the wind turbine.

13. The method according to claim 8, wherein the energy to be fed into the grid is determined based on an efficiency of the wind turbine.

14. A wind turbine comprising a wind rotor comprising at least one rotor blade, wherein the wind rotor is mechanically connected to a generator for transmitting a rotational power of the wind rotor to a rotor of the generator, wherein an output current of the generator is to be selectively connected to a grid by a circuit breaker, the wind turbine further comprising a control device configured to close or to trip the circuit breaker, wherein the control device is configured to:
operate the wind turbine in a run-up mode, wherein the wind turbine parameters are adjusted to increase a rotational speed of the wind rotor, and wherein it is determined whether enemy provided by the wind turbine would exceed a predetermined amount of energy to be fed into the grid at an actual rotational speed of the wind rotor; wherein during increasing of the rotational speed of the wind rotor, the rotational speed is not substantially constant for 5 seconds or more, and
change from the run-up mode into a load operation mode and connect the generator of the wind turbine to the grid after the energy provided by the wind turbine exceeds the predetermined amount of energy to be fed into the grid at the actual rotational speed of the wind rotor in the run-up mode.

15. The wind turbine according to claim 14, wherein the control device is further configured to adjust the wind turbine parameters to drive the wind turbine in an optimal operating point after the generator is connected to the grid, depending on environmental conditions and the wind turbine parameters.

16. The wind turbine according to claim 14, wherein the control device is further configured to operate the wind turbine in a spinning mode in which the at least one rotor blade of the wind rotor is operated with a substantial constant pitch angle and the generator of the wind turbine is not electrically connected to the grid.

17. The wind turbine according to claim 16, wherein the control device is further configured to control the pitch angle of the at least one rotor blade in the run-up mode depending on loads acting on the wind turbine.

18. The wind turbine according to claim 16, wherein the control device is configured to decrease substantially monotonic the pitch angle of the at least one rotor blade from a substantial constant pitch angle of the spinning mode to a pitch angle of less than 5 degrees with respect to the rotor plane in the run-up mode.

19. The wind turbine according to claim 14, wherein the control device is configured to determine the energy to be fed into the grid depending on an efficiency of the wind turbine.

20. The wind turbine according to claim 14, wherein, the control device is further configured to change the mode of the wind turbine from the load operation mode to the run-up mode if at least one of the following is fulfilled:
the rotational speed of the wind rotor is below a predetermined minimal load rotational speed, and
the power fed into the grid is within a predetermined time below a predetermined minimal power.

* * * * *

UNITED STATES PATENT AND TRADEMARK OFFICE
CERTIFICATE OF CORRECTION

| | | |
|---|---|---|
| PATENT NO. | : 8,115,330 B2 | Page 1 of 1 |
| APPLICATION NO. | : 12/826331 | |
| DATED | : February 14, 2012 | |
| INVENTOR(S) | : Menke | |

It is certified that error appears in the above-identified patent and that said Letters Patent is hereby corrected as shown below:

In Column 8, Line 52, in Claim 1, delete "enemy" and insert -- energy --, therefor.

In Column 10, Line 9, in Claim 14, delete "enemy" and insert -- energy --, therefor.

Signed and Sealed this
First Day of May, 2012

David J. Kappos
*Director of the United States Patent and Trademark Office*